US011946589B1

(12) United States Patent
Balutkar et al.

(10) Patent No.: US 11,946,589 B1
(45) Date of Patent: Apr. 2, 2024

(54) STAND SYSTEM FOR PORTABLE ELECTRONIC DEVICE

(71) Applicant: Pioneer Square Brands, Inc., Seattle, WA (US)

(72) Inventors: Vrushank Deepak Balutkar, Jamestown, NC (US); Riley Edwin Lynch, Greensboro, NC (US); Quentin Wade Forbes, Winston Salem, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 18/501,682

(22) Filed: Nov. 3, 2023

(51) Int. Cl.
*F16M 11/22* (2006.01)
*F16M 11/04* (2006.01)

(52) U.S. Cl.
CPC ........... *F16M 11/22* (2013.01); *F16M 11/041* (2013.01)

(58) Field of Classification Search
USPC ....... 248/176.1, 177.1, 127, 146, 154, 187.1
See application file for complete search history.

(56) References Cited

U.S. PATENT DOCUMENTS

| | | | | |
|---|---|---|---|---|
| 7,287,652 B2 * | 10/2007 | Scholen | ................... | A47F 7/02 340/568.2 |
| 8,360,373 B2 * | 1/2013 | Johnson | ................. | H05K 7/026 340/568.1 |
| 8,558,414 B2 * | 10/2013 | Warren | ................... | H02M 1/00 307/154 |
| 8,602,376 B2 * | 12/2013 | Vogel | ........................ | F16B 1/00 248/371 |
| 8,674,833 B2 * | 3/2014 | Johnston | ................. | A47F 7/024 341/172 |
| 11,684,191 B2 * | 6/2023 | Bizarria | ................ | F16B 47/003 248/542 |
| 2009/0166483 A1 * | 7/2009 | Marsilio | .............. | F16M 11/041 248/187.1 |
| 2011/0068920 A1 * | 3/2011 | Yeager | ................... | F16M 13/02 340/568.8 |
| 2013/0048802 A1 * | 2/2013 | Guran | .................. | F16M 11/041 248/122.1 |
| 2015/0076297 A1 * | 3/2015 | Parrill | .................... | F16M 13/04 248/176.3 |
| 2015/0207909 A1 * | 7/2015 | Nielsen | ................... | H04M 1/04 455/575.1 |

\* cited by examiner

*Primary Examiner* — Alfred J Wujciak
(74) *Attorney, Agent, or Firm* — Grandview Law

(57) ABSTRACT

A stand system for a portable electronic device includes a column having a top end, a cap member coupled with the top end of the column, wherein the cap member includes a mechanical coupler. The stand system includes an upper coupler assembly including an adherent surface for coupling with the portable electronic device, and a mechanical coupler removably coupled to the mechanical coupler of the cap member. Other aspects are described in the claims, drawings, and text forming a part of the present disclosure.

7 Claims, 17 Drawing Sheets

STAND SYSTEM FOR PORTABLE ELECTRONIC DEVICE

SUMMARY

In one or more aspects a stand system for a portable electronic device include (I) a column having a top end, a bottom end, and at least one length, wherein the top end is distanced from the bottom end by the at least one length; (II) a cap member coupled with the top end of the column, wherein the cap member includes a mechanical coupler; and (III) an upper coupler assembly including (A) an adherent surface for coupling with the portable electronic device, and (B) a mechanical coupler removably coupled to the mechanical coupler of the cap member. Wherein the adherent surface of the upper coupler assembly is one side of a double-sided adhesive tape. Further including an elongated member, wherein the mechanical coupler of the cap member includes first and second apertures, and wherein the mechanical coupler of the upper coupler assembly includes a first channel. Wherein the elongated member is removably coupled to the first and second apertures of the mechanical coupler of the cap member, and wherein the elongated member is removably coupled to the first channel of the mechanical coupler of the upper coupler assembly thereby removably coupling the mechanical coupler of the cap member to the mechanical coupler of the upper coupler assembly. Wherein the mechanical coupler of the upper coupler assembly includes a second channel perpendicularly extending with respect to the first channel of the mechanical coupler of the upper coupler assembly, wherein the elongated member is removably coupled to the first and second apertures of the mechanical coupler of the cap assembly, and wherein the elongated member is removably coupled to the second channel of the mechanical coupler of the upper coupler assembly thereby coupling the mechanical coupler of the cap assembly to the mechanical coupler of the upper coupler assembly. Wherein the first channel of the mechanical coupler of the upper coupler assembly includes at least one ring member, and wherein the second channel of the mechanical coupler of the upper coupler assembly includes at least one ring member. Wherein the elongated member is a pin. Wherein the mechanical coupler of the upper coupler assembly includes at least one magnet, wherein the mechanical coupler of the cap member includes at least one metal plate, and wherein the at least one magnet of the mechanical coupler of the upper coupler assembly is removably coupled to the at least one metal plate of the mechanical coupler of the cap member. Wherein the mechanical coupler of the upper coupler assembly includes at least one metal plate, wherein the mechanical coupler of the cap member includes at least one magnet, and wherein the at least one metal plate of the mechanical coupler of the upper coupler assembly is removably coupled to the at least one magnet of the mechanical coupler of the cap member. Wherein the mechanical coupler of the upper coupler assembly includes a first member and a second member, wherein the first member has at least one pronged stem, and wherein the second member has at least one slot coupled with the at least one pronged stem of the first member. Wherein the mechanical coupler of the upper coupler assembly includes an first member and a second member coupled together, wherein the first member has at least one channel groove, and wherein the second member has at least one ring at least partially located in the at least one channel groove of the first member. Wherein the column includes an interior, wherein the cap member includes a base with an aperture to provide access to the interior of the column, wherein the cap member includes a first side and a second side perpendicular to the first side, wherein the first side of the cap member includes a first slot and the second side of the cap member includes a second slot, and wherein the mechanical coupler of the upper coupler assembly includes a channel that is aligned with the first slot and the second slot of the cap member when the mechanical coupler of the upper coupler assembly is in a first position and a second position, respectively, to access the aperture of the base of the cap member to access the interior of the column.

In one or more aspects a stand system for a portable electronic device includes (I) a column having a first end and a second end; and (II) a coupler assembly including (A) an adherent surface for coupling with the portable electronic device, and (B) a mechanical coupler removably coupled to the first end of the column. Wherein the first end of the column includes first and second apertures, and wherein the mechanical coupler of coupler assembly includes a first channel, wherein the pin is removably couples to the first and second apertures of the first end of the column, and wherein the pin is removably couples to the first channel of the mechanical coupler of the coupler assembly thereby removably coupling the first end of the column to the mechanical coupler of the coupler assembly. Wherein the mechanical coupler of the coupler assembly includes a second channel perpendicularly extending with respect to the first channel of the mechanical coupler of the coupler assembly, and wherein the second channel of the mechanical coupler of the coupler assembly removably couples with the pin to removably couple with the first end of the column. Wherein the column includes an interior, wherein the first end of the column includes an aperture to provide access the interior of the column, wherein the column includes a first side and a second side perpendicular to the first side, wherein the first side of the column includes a first slot and the second side of the column includes a second slot, and wherein the mechanical coupler of the coupler assembly includes a channel that is aligned with the first slot and the second slot of the cap member when the mechanical coupler of the coupler assembly is in a first position and a second position, respectively, to access the aperture of the first end of the column to access the interior of the column.

In one or more aspects a stand system for a portable electronic device includes (I) a column having a first end; and (II) an adherent surface for coupling with the portable electronic device, the adherent surface removably coupled to the first end of the column. Wherein the adherent surface of the upper coupler assembly is one side of a double-sided adhesive tape. Wherein the adherent surface is removably coupled to the first end of the column via the at least one magnet. Wherein the adherent surface is removably coupled to the first end of the column via the at least one pin.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Stand System for Portable Electronic Device, articles of manufacture, compositions of matter for same that may provide context, for instance, in introducing one or more processes and/or devices described herein.

DETAILED DESCRIPTION

Figure 1:
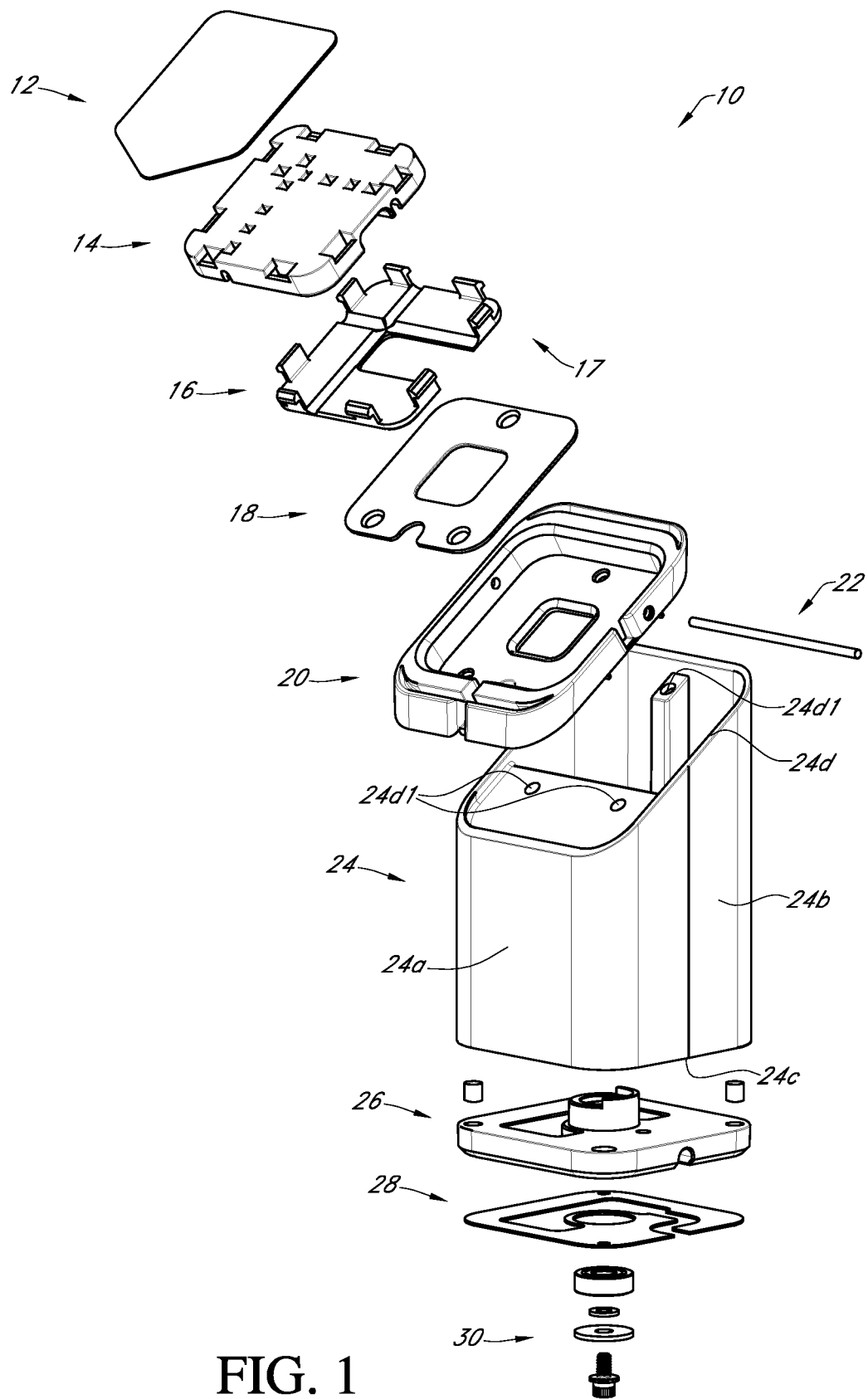
FIG. 1 is an exploded top perspective view of stand assembly 10.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is an exploded top perspective view of stand assembly 10. Depicted implementation of stand assembly 10 is shown to include double-sided adhesive member 12 (such as double-sided adhesive tape), upper member 14, upper coupler assembly 17, and metallic plate 18 with upper coupler assembly 17 including double-sided adhesive member 12, upper member 14, and lower member 16. Depicted implementation of stand assembly 10 is shown to include metallic plate 18, cap member 20, pin 22 (an example of an elongated member), column assembly 24 with column side 24a, column side 24b, column bottom end 24c, and column top end 24d with aperture 24d1. Depicted implementation of stand assembly 10 is shown to include foundational platform 26, double-sided adhesive member 28 (such as double-sided adhesive tape) having oppositely facing adherent surfaces, and lower coupler assembly 30.

Figure 2:
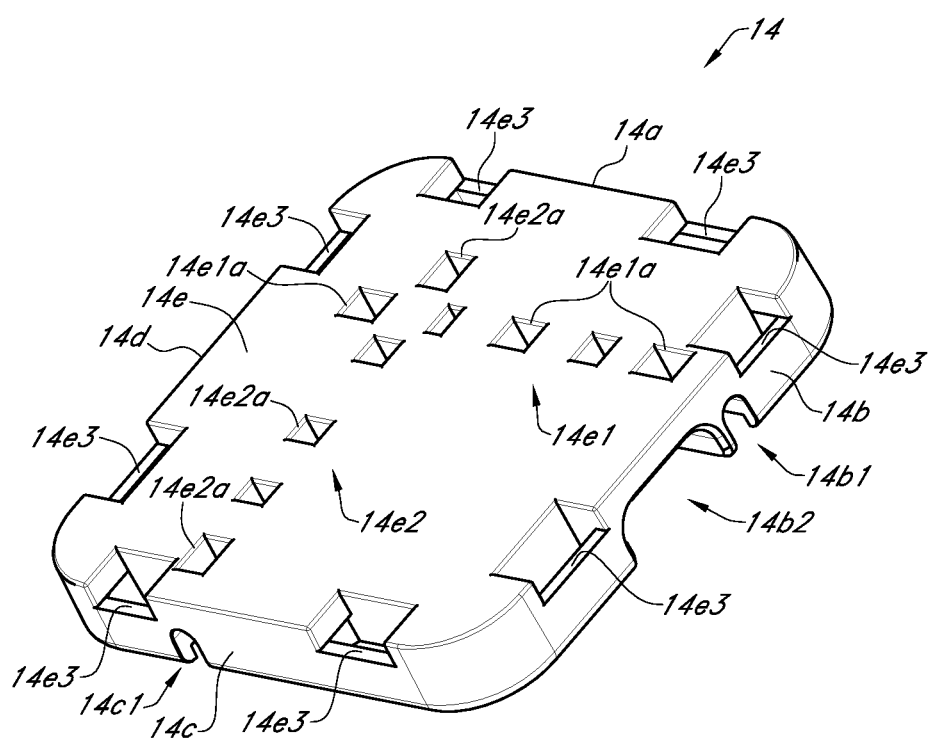
FIG. 2 is a top perspective view of upper member 14 of stand assembly 10.

Turning to FIG. 2, depicted therein is a top perspective view of upper member 14 of stand assembly 10. Depicted implementation of upper member 14 is shown to include side 14a, side 14b with channel 14b1 and channel 14b2, side 14c with channel 14c1, side 14d, upper base side 14e with aperture arrangement 14e1, aperture arrangement 14e2, and slot 14e3. Depicted implementation of aperture arrangement 14e1 is shown to irclude aperture 14e1a, aperture arrangement 14e2, and aperture 14e2a.

Figure 3:
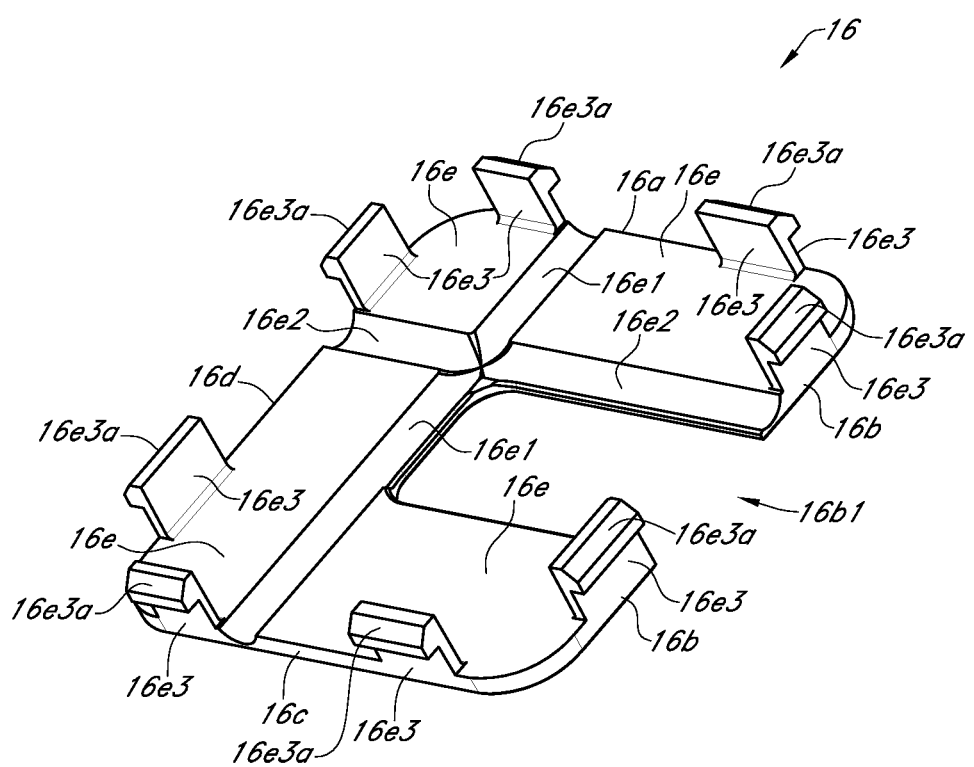
FIG. 3 is a top perspective view of lower member 16 of stand assembly 10.

Turning to FIG. 3, depicted therein is a top perspective view of lower member 16 of stand assembly 10. Depicted implementation of lower member 16 is shown to include side 16a, side 16b with channel 16b1, side 16c, side 16d, upper base surface 16e with channel 16e1, channel 16e2, and stem 16e3 with prong 16e3a.

Figure 4:
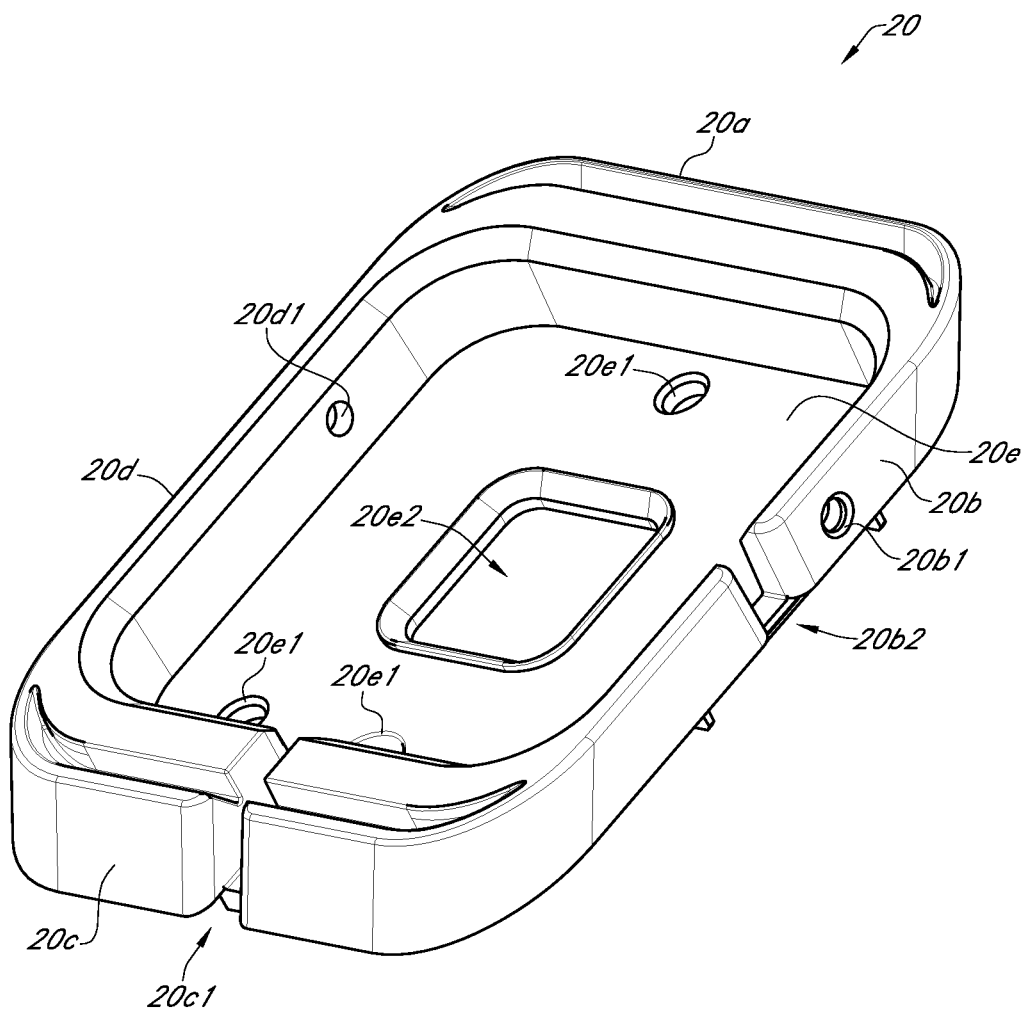
FIG. 4 is a top perspective view of cap member 20 of stand assembly 10.

Turning to FIG. 4, depicted therein is a top perspective view of cap member 20 of stand assembly 10. Depicted implementation of cap member 20 is shown to include side 20a, side 20b with aperture 20b1 and slot 20b2, side 20c with slot 20c1, side 20d with aperture 20d1, and base 20e with aperture 20e1 and aperture 20e2. As depicted, aperture 20b1 and aperture 20d1 serve as a mechanical coupler along with pin 22 being removably couplable therewith and along with channel 16e1, channel 16e2 serving as mechanical couplers being removably couplable with pin 22 as well.

Figure 5:
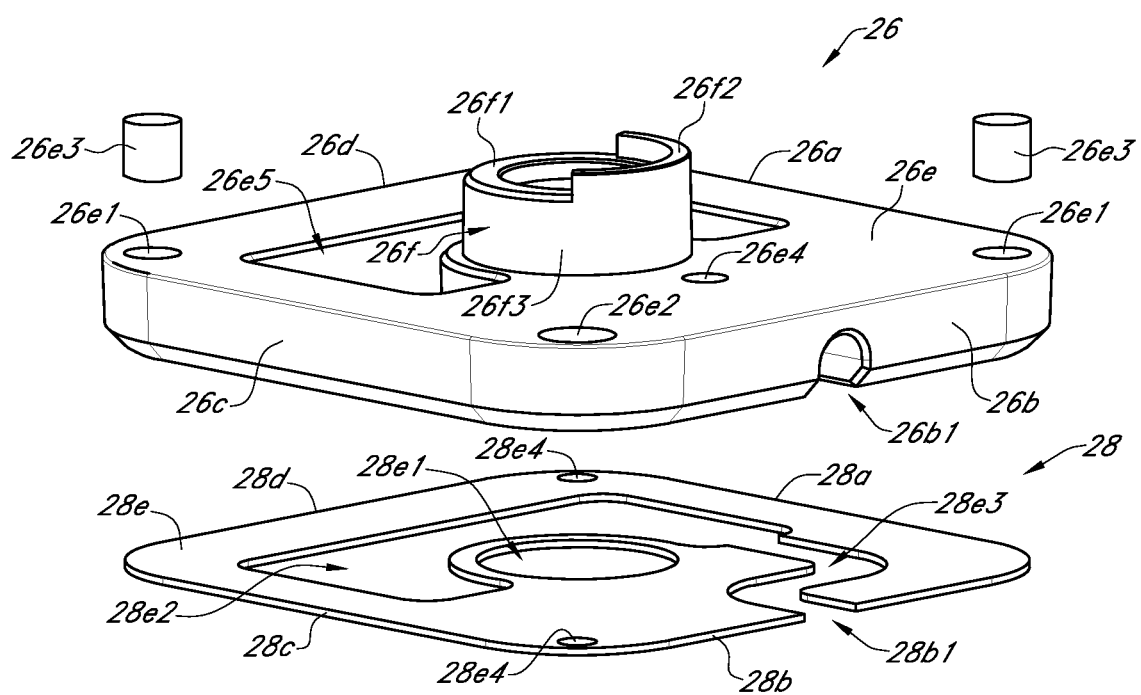
FIG. 5 is a top perspective view of foundational platform 26 and double-sided adhesive member 28 of stand assembly 10.

Turning to FIG. 5, depicted therein is a top perspective view of foundational platform 26 and double-sided adhesive member 28 of stand assembly 10. Depicted implementation of foundational platform 26 is shown to include side 26a, side 26b with channel 26b1, side 26c, side 26d, and base plate 26e with aperture 26e1, aperture 26e2, magnet 26e3, aperture 26e4, and open area 26e5. Depicted implementation of foundational platform 26 is shown to include tubular protrusion 26f, with upper surface 26f1, semi-circular projection 26f2, and exterior portion 26f3.

Depicted implementation of double-sided adhesive member 28 is shown to include side 28a, side 28b with channel opening 28b1, side 28c, side 28d, base 28e with central aperture 28e1, opening area 28e2, channel 28e3, and aperture 28e4.

Figure 6:
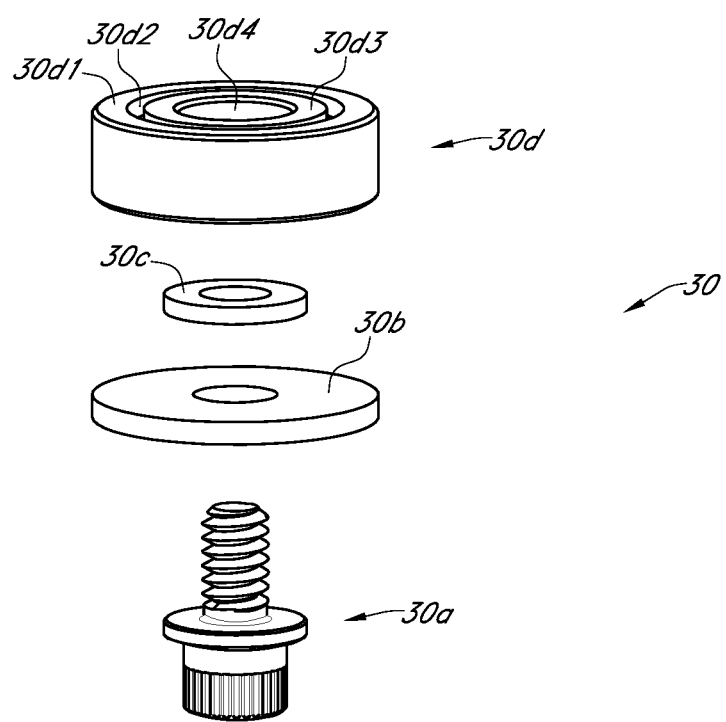
FIG. 6 is a top perspective view of lower coupler assembly 30 of stand assembly 10.

Turning to FIG. 6, depicted therein is a top perspective view of lower coupler assembly 30 of stand assembly 10. Depicted implementation of lower coupler assembly 30 is shown to include bolt 30a, washer 30b, washer 30c, bearing assembly 30d with outer race 30d1, ball plurality 30d2, inner race 30d3, and aperture 30d4.

Figure 7:
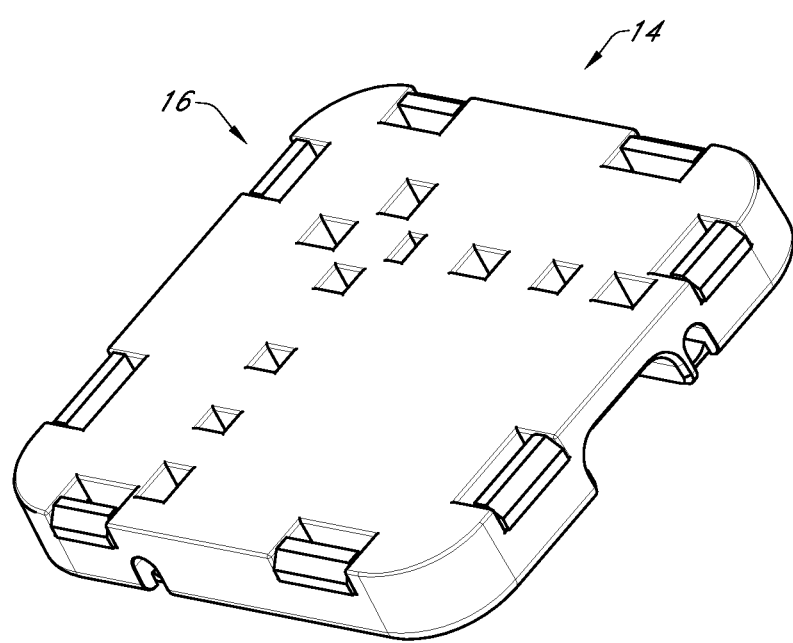
FIG. 7 is a top perspective view of upper member 14 and lower member 16 of stand assembly 10.

Turning to FIG. 7, depicted therein is a top perspective view of upper member 14 and lower member 16 of stand assembly 10.

Figure 8:
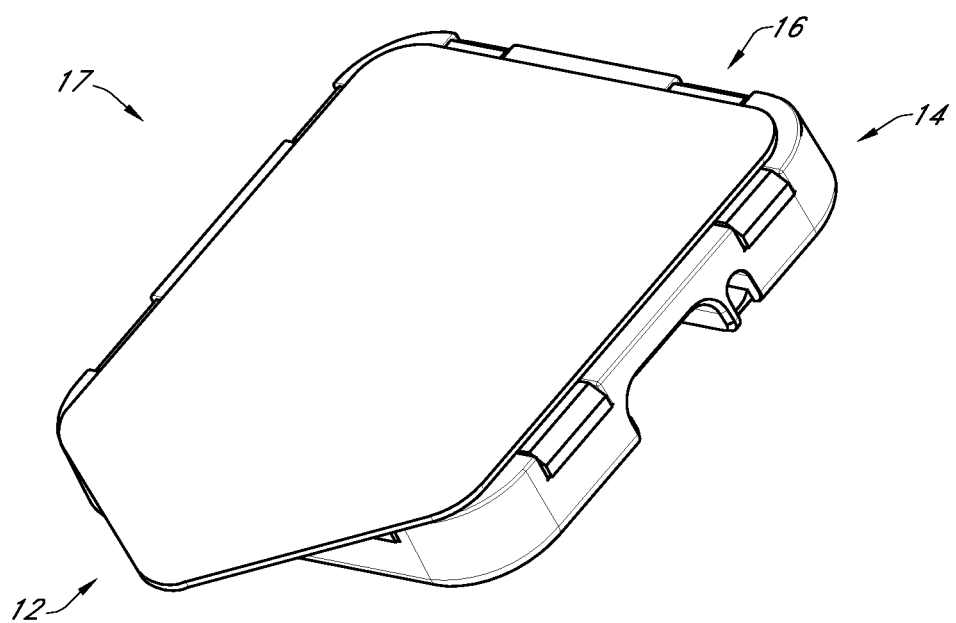
FIG. 8 is a top perspective view of upper coupler assembly of stand assembly 10.

Turning to FIG. 8, depicted therein is a top perspective view of upper coupler assembly 17 of stand assembly 10.

Figure 9:
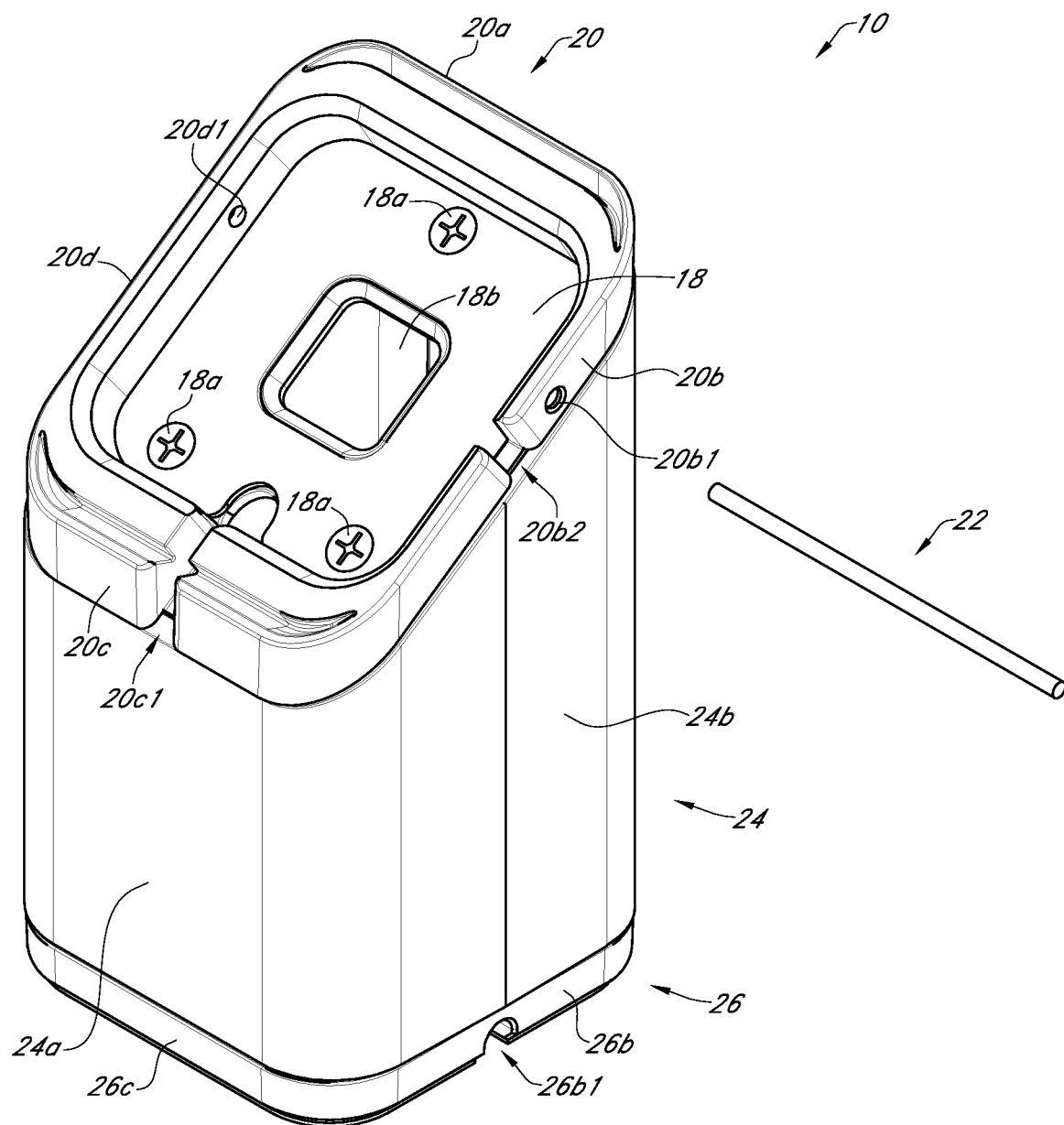
FIG. 9 is a top perspective partial view of stand assembly 10.

Turning to FIG. 9, depicted therein is a top perspective partial view of stand assembly 10 showing metallic plate 18 to include screw 18a and aperture 18b.

Figure 10:
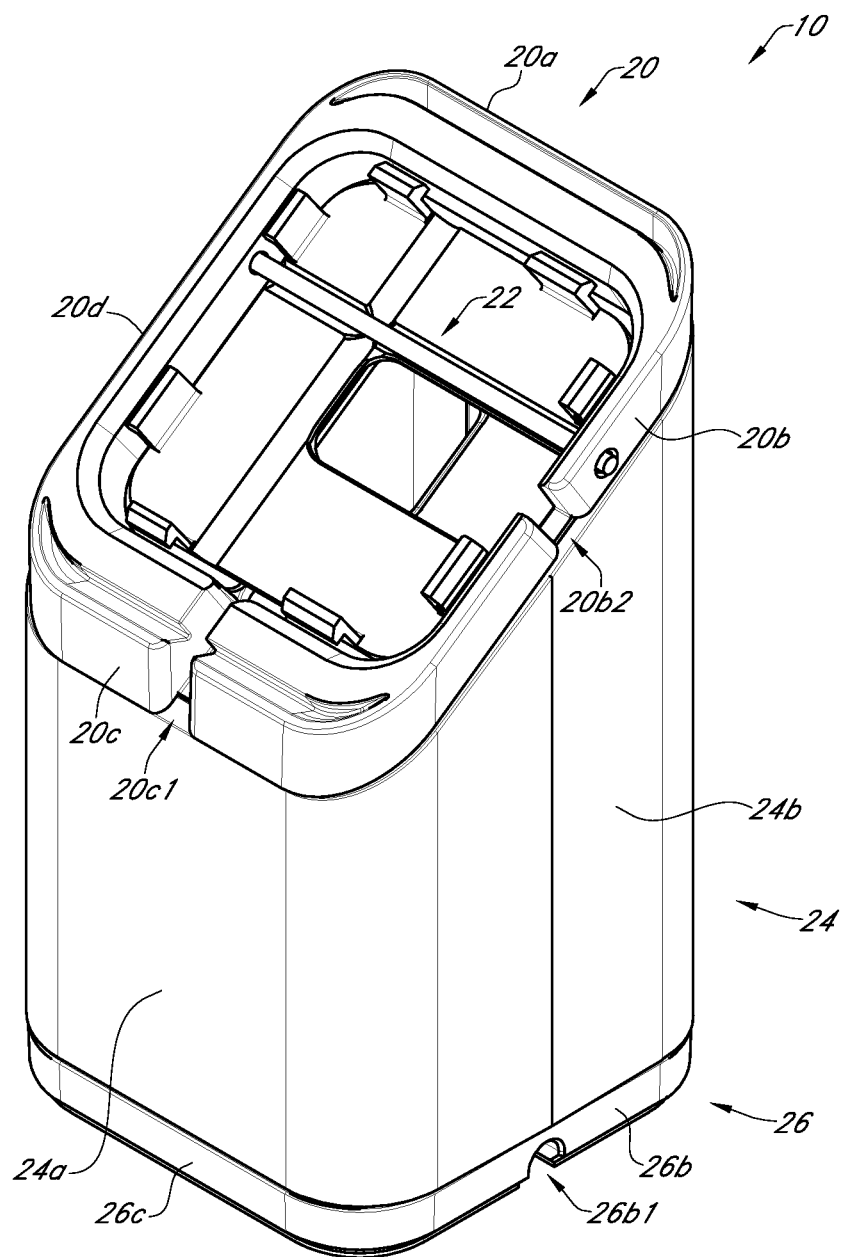
FIG. 10 is a top perspective partial view of stand assembly 10.

Turning to FIG. 10, depicted therein is a top perspective partial view of stand assembly 10.

Figure 11:
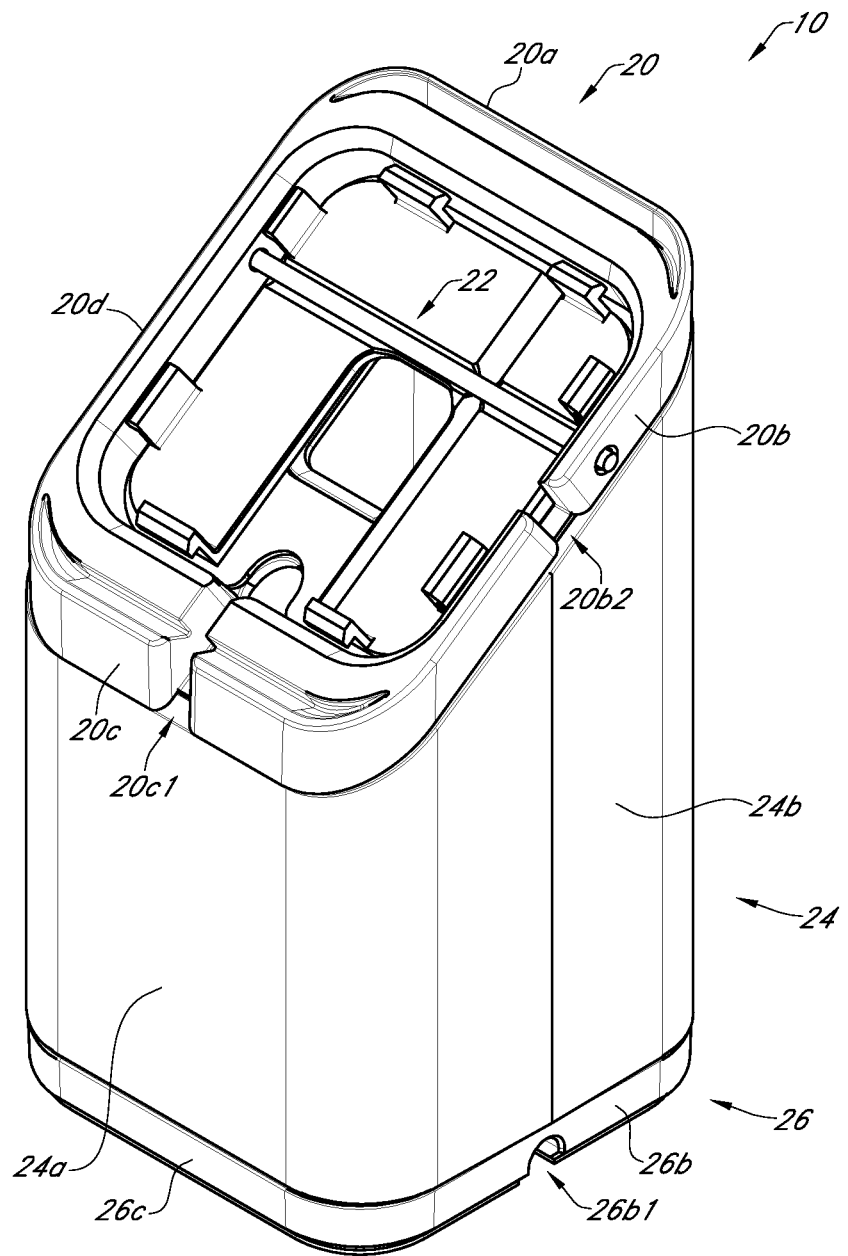
FIG. 11 is a top perspective partial view of stand assembly 10.

Turning to FIG. 11, depicted therein is a top perspective partial view of stand assembly 10.

Figure 12:
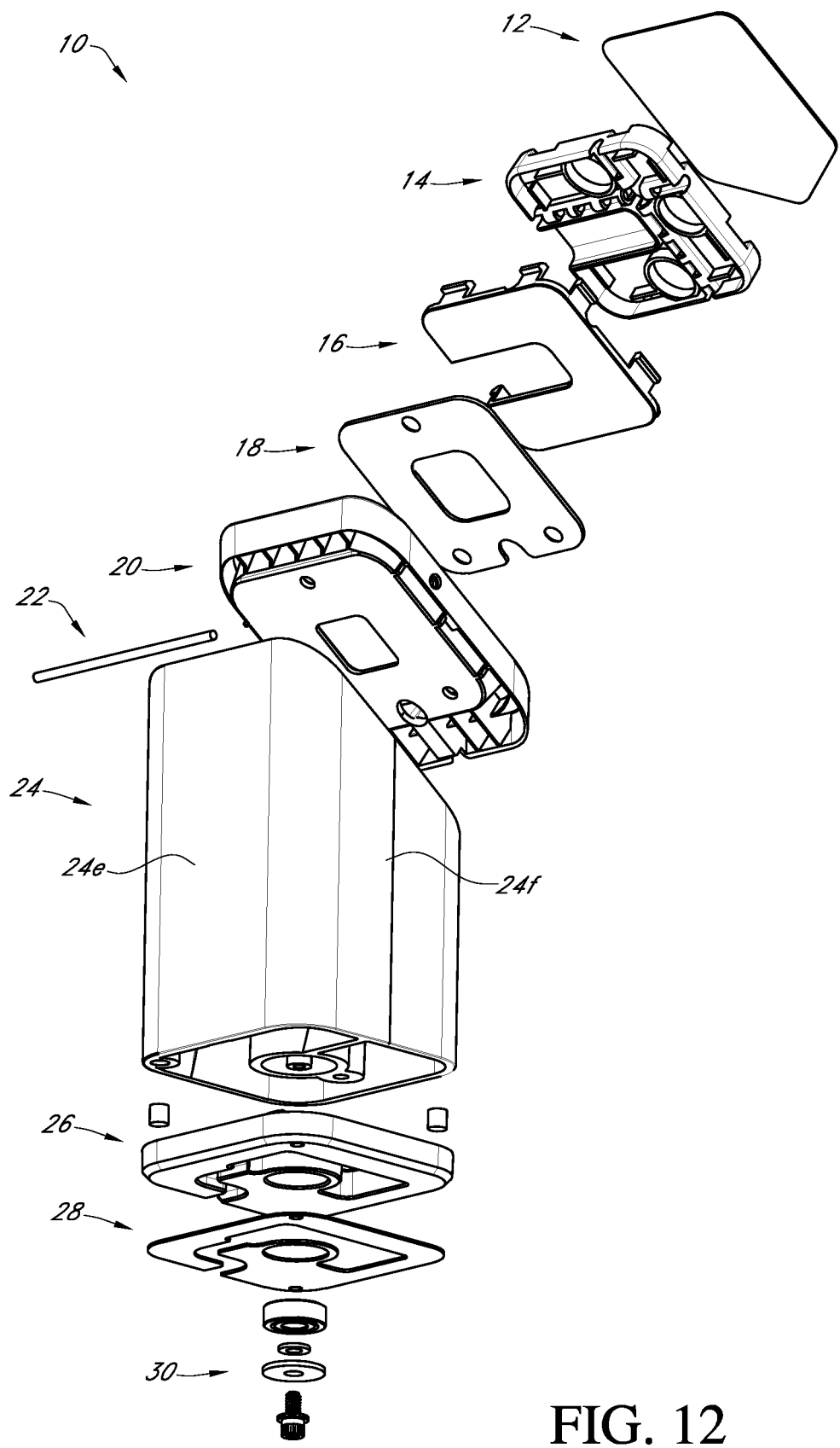
FIG. 12 is an exploded bottom perspective view of stand assembly 10.

Turning to FIG. 12, depicted therein is an exploded bottom perspective view of stand assembly 10. Depicted implementation of column assembly 24 is shown to include column side 24e, and column side 24f.

Figure 13:
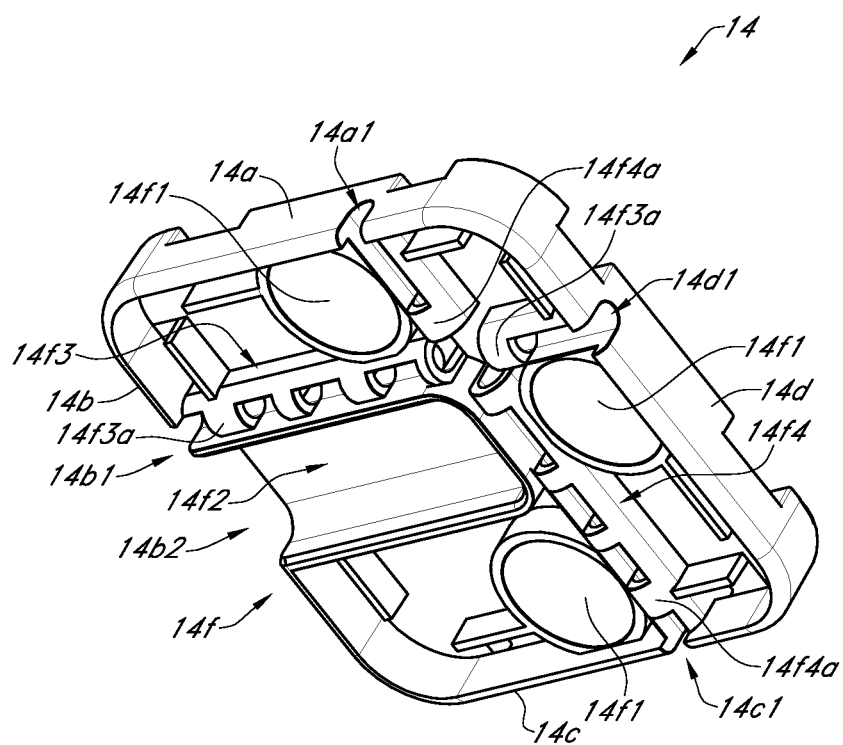
FIG. 13 is a bottom perspective view of upper member 14 of stand assembly 10.

Turning to FIG. 13, depicted therein is a bottom perspective view of upper member 14 of stand assembly 10. Depicted implementation of upper member 14 is shown to include channel 14a1, channel 14d1, lower base side 14f with magnet 14f1, channel 14f2, channel 14f3 with ring member 14f3a, and channel 14f4 with ring member 14f4a. As depicted, magnet 14f1 and metallic plate 18 serve as mechanical couplers to removably couple with each other. As depicted, channel 14f3 with ring member 14f3a, and channel 14f4 with ring member 14f4a are received by channel 16e2 and channel 16e1, respectively, serving as mechanical couplers being removably couplable with pin 22 as well.

Figure 14:
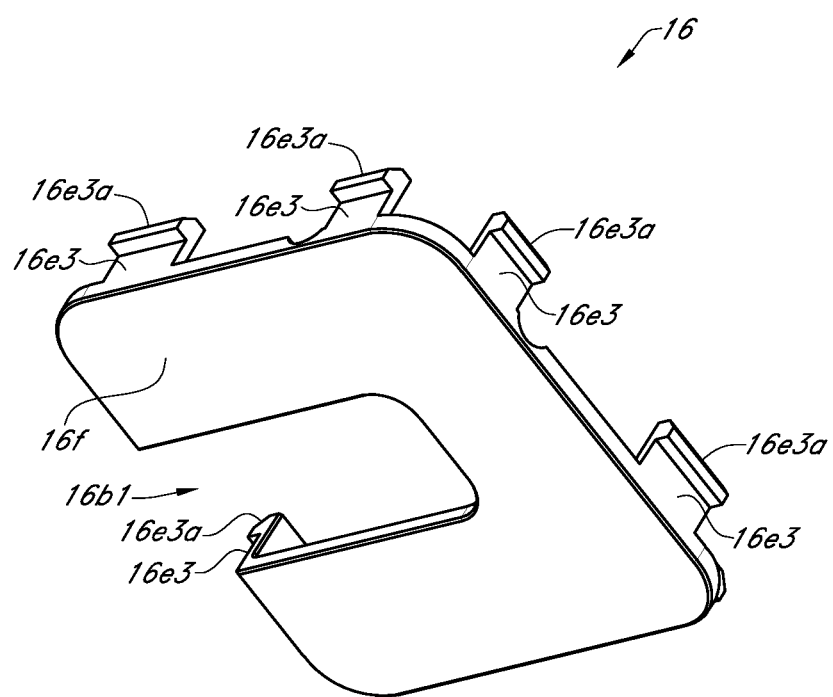
FIG. 14 is a bottom perspective view of lower member 16 of stand assembly 10.

Turning to FIG. 14, depicted therein is a bottom perspective view of lower member 16 of stand assembly 10. Depicted implementation of lower member 16 is shown to include lower base surface 16f.

Figure 15:
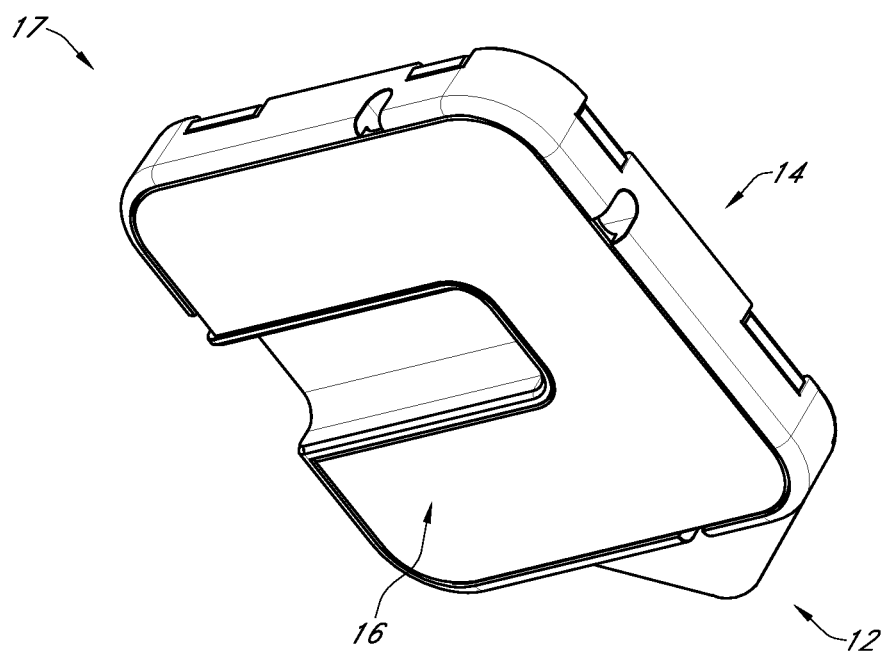
FIG. 15 is a bottom perspective view of upper coupler assembly of stand assembly 10.

Turning to FIG. 15, depicted therein is a bottom perspective view of upper coupler assembly 17 of stand assembly 10.

Figure 16:
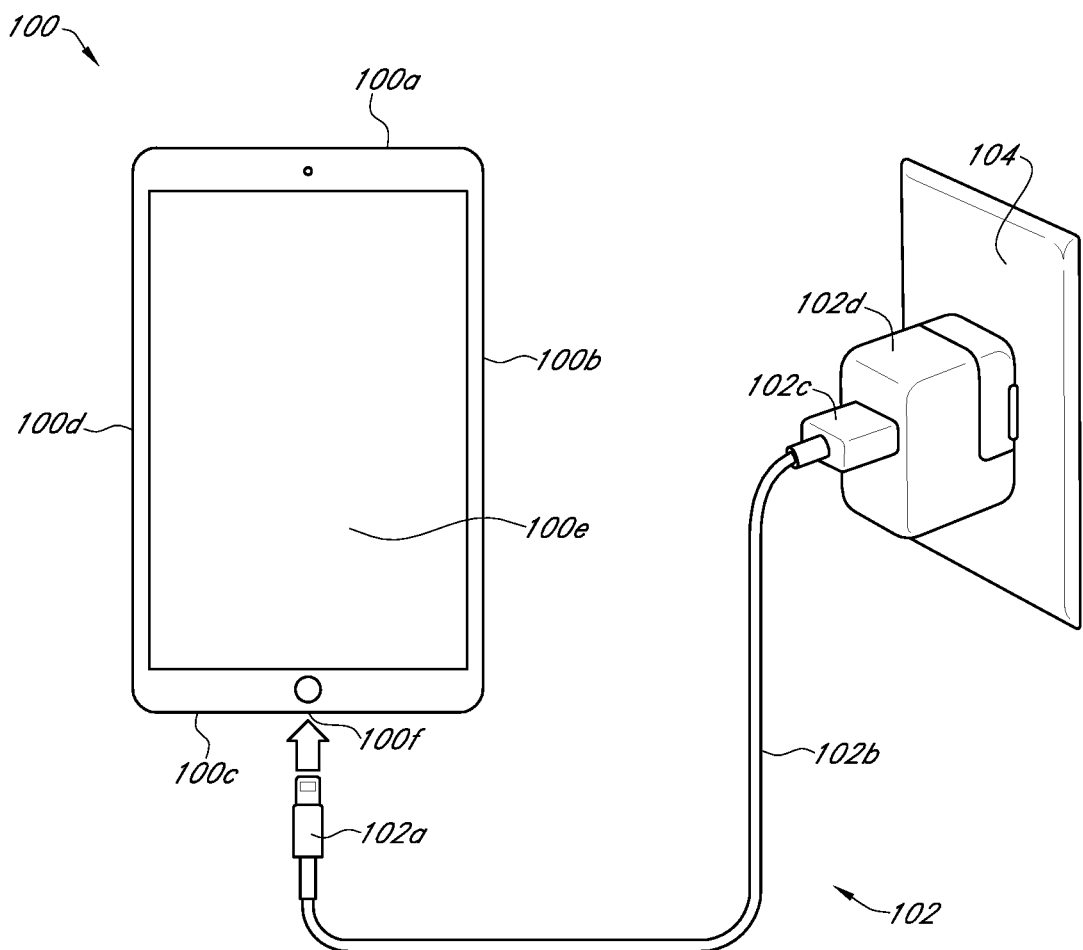
FIG. 16 is a front elevational view of electronic tablet 100 with a perspective view of cable assembly 102 and power outlet 104.

Turning to FIG. 16, depicted therein is a front elevational view of electronic tablet 100 with a perspective view of cable assembly 102 and power outlet 104. Depicted implementation of electronic tablet 100 is shown to include side 100a, side 100b, side 100c, side 100d, front 100e, and port 100f.

Depicted implementation of cable assembly 102 is shown to include connector 102a, cable 102b, connector 102c, and power plug 102d.

Figure 17:
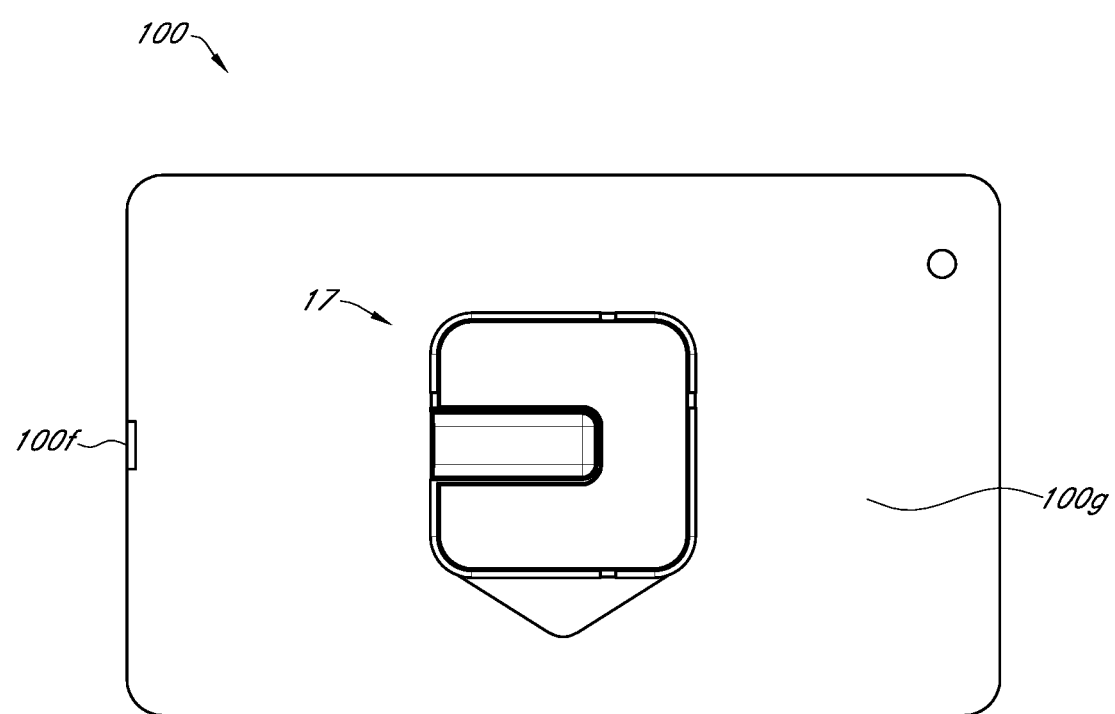
FIG. 17 is a rear elevational view of electronic tablet 100 coupled with upper coupler assembly of stand assembly 10.

Turning to FIG. 17, depicted therein is a rear elevational view of electronic tablet 100 coupled with upper coupler assembly 17 of stand assembly 10. Depicted implementation of electronic tablet 100 is shown to include rear 100g.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A stand system for a portable electronic device comprising:
   (I) a column having a top end, a bottom end, and at least one length, wherein the top end is distanced from the bottom end by the at least one length;
   (II) a cap member coupled with the top end of the column, wherein the cap member includes a mechanical coupler;
   (III) an upper coupler assembly including
      (A) an adherent surface for coupling with the portable electronic device, and
      (B) a mechanical coupler removably coupled to the mechanical coupler of the cap member; and
   (IV) an elongated member,
   wherein the mechanical coupler of the cap member includes first and second apertures, and
   wherein the mechanical coupler of the upper coupler assembly includes a first channel, wherein the elongated member is removably coupled to the first and second apertures of the mechanical coupler of the cap member, and wherein the elongated member is removably coupled to the first channel of the mechanical coupler of the upper coupler assembly thereby removably coupling the mechanical coupler of the cap member to the mechanical coupler of the upper coupler assembly, wherein the mechanical coupler of the upper coupler assembly includes a second channel perpendicularly extending with respect to the first channel of the mechanical coupler of the upper coupler assembly, wherein the elongated member is removably coupled to the first and second apertures of the mechanical coupler of the cap assembly, and wherein the elongated member is removably coupled to the second channel of the mechanical coupler of the upper coupler assembly thereby coupling the mechanical coupler of the cap assembly to the mechanical coupler of the upper coupler assembly.

2. The system of claim 1 wherein the adherent surface of the upper coupler assembly is one side of a double-sided adhesive tape.

3. The system of claim 1 wherein the first channel of the mechanical coupler of the upper coupler assembly includes at least one ring member, and wherein the second channel of the mechanical coupler of the upper coupler assembly includes at least one ring member.

4. The system of claim 1 wherein the elongated member is a pin.

5. A stand system for a portable electronic device comprising:
(I) a column having a top end, a bottom end, and at least one length, wherein the top end is distanced from the bottom end by the at least one length;
(II) a cap member coupled with the top end of the column, wherein the cap member includes a mechanical coupler; and
(III) an upper coupler assembly including
(A) an adherent surface for coupling with the portable electronic device, and
(B) a mechanical coupler removably coupled to the mechanical coupler of the cap member,
wherein the mechanical coupler of the upper coupler assembly includes at least one metal plate,
wherein the mechanical coupler of the cap member includes at least one magnet, and
wherein the at least one metal plate of the mechanical coupler of the upper coupler assembly is removably coupled to the at least one magnet of the mechanical coupler of the cap member, wherein the mechanical coupler of the upper coupler assembly includes a first member and a second member, wherein the first member has at least one pronged stem, and wherein the second member has at least one slot coupled with the at least one pronged stem of the first member.

6. A stand system for a portable electronic device comprising:
(I) a column having a top end, a bottom end, and at least one length, wherein the top end is distanced from the bottom end by the at least one length;
(II) a cap member coupled with the top end of the column, wherein the cap member includes a mechanical coupler; and
(III) an upper coupler assembly including
(A) an adherent surface for coupling with the portable electronic device, and
(B) a mechanical coupler removably coupled to the mechanical coupler of the cap member,
wherein the mechanical coupler of the upper coupler assembly includes an first member and a second member coupled together,
wherein the first member has at least one channel groove, and
wherein the second member has at least one ring at least partially located in the at least one channel groove of the first member.

7. A stand system for a portable electronic device comprising:
(I) a column having a top end, a bottom end, and at least one length, wherein the top end is distanced from the bottom end by the at least one length;
(II) a cap member coupled with the top end of the column, wherein the cap member includes a mechanical coupler; and
(III) an upper coupler assembly including
(A) an adherent surface for coupling with the portable electronic device, and
(B) a mechanical coupler removably coupled to the mechanical coupler of the cap member,
wherein the column includes an interior,
wherein the cap member includes a base with an aperture to provide access to the interior of the column,
wherein the cap member includes a first side and a second side perpendicular to the first side,
wherein the first side of the cap member includes a first slot and the second side of the cap member includes a second slot, and
wherein the mechanical coupler of the upper coupler assembly includes a channel that is aligned with the first slot and the second slot of the cap member when the mechanical coupler of the upper coupler assembly is in a first position and a second position, respectively, to access the aperture of the base of the cap member to access the interior of the column.

* * * * *